United States Patent
Miskie et al.

(10) Patent No.: US 11,352,896 B2
(45) Date of Patent: Jun. 7, 2022

(54) TUBE ASSEMBLY FOR A GAS TURBINE ENGINE

(71) Applicant: PRATT & WHITNEY CANADA CORP., Longueuil (CA)

(72) Inventors: Ryan Miskie, Guelph (CA); Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/999,135

(22) Filed: Aug. 21, 2020

(65) Prior Publication Data

US 2022/0056851 A1    Feb. 24, 2022

(51) Int. Cl.
*F01D 9/06* (2006.01)
*F02C 7/06* (2006.01)

(52) U.S. Cl.
CPC .............. *F01D 9/065* (2013.01); *F02C 7/06* (2013.01); *F05D 2230/237* (2013.01); *F05D 2240/50* (2013.01); *F05D 2240/55* (2013.01); *F05D 2250/42* (2013.01); *F05D 2260/98* (2013.01)

(58) Field of Classification Search
CPC ............. F01D 9/065; F01D 25/16–22; F16L 27/00–12751; F01M 11/02
See application file for complete search history.

(56) References Cited

U.S. PATENT DOCUMENTS

| | | | |
|---|---|---|---|
| 3,198,556 A | 8/1965 | Kruse et al. | |
| 5,098,133 A * | 3/1992 | Glover | F16L 27/125 285/23 |
| 5,765,534 A * | 6/1998 | Brown | F02M 55/005 123/470 |
| 5,890,746 A | 4/1999 | Mueller | |
| 6,412,820 B1 * | 7/2002 | Erps | F16L 19/005 285/123.1 |
| 8,240,974 B2 | 8/2012 | Nyamu et al. | |
| 9,797,534 B2 * | 10/2017 | Ho | F01M 11/02 |
| 9,932,898 B2 | 4/2018 | Milne | |
| 10,240,534 B2 | 3/2019 | Sheil et al. | |
| 2001/0025476 A1 * | 10/2001 | Eldrid | F01D 5/088 60/772 |

(Continued)

FOREIGN PATENT DOCUMENTS

DE    102015202481 A1 *  8/2015 .............. F16L 27/12
EP    2839198 A1    2/2015

(Continued)

OTHER PUBLICATIONS

Partial European Search Report issued in counterpart application EP 21192599.5 dated Jan. 3, 2022.

*Primary Examiner* — Topaz L. Elliott
(74) *Attorney, Agent, or Firm* — Norton Rose Fulbright Canada LLP (57) ABSTRACT

A tube assembly for a gas turbine engine includes a rigid tube having first and second ends for connection to first port and second ports on the gas turbine engine. The first and second ports have different orientations providing for different installation vectors. The tube assembly further includes a tube adapter adjustably connected to the second port and a coupling, which, is, in turn, adjustably mounted to a distal end of the tube adapter for connection with the second end of the tube.

15 Claims, 6 Drawing Sheets

(56) References Cited

U.S. PATENT DOCUMENTS

| | | | | |
|---|---|---|---|---|
| 2012/0011824 A1* | 1/2012 | Cigal | ...................... | F01D 25/16 |
| | | | | 60/39.08 |
| 2015/0176733 A1* | 6/2015 | Ho | .......................... | F01M 5/002 |
| | | | | 285/302 |
| 2017/0058696 A1* | 3/2017 | Manteiga | ................. | F01D 25/24 |
| 2018/0119575 A1* | 5/2018 | Bouiller | .................. | F01D 9/065 |

FOREIGN PATENT DOCUMENTS

| GB | 778365 A * | 7/1957 | .............. F16L 27/12 |
|---|---|---|---|
| GB | 1275097 A | 5/1972 | |
| GB | 2012902 A | 8/1979 | |

\* cited by examiner

FIG_2

TUBE ASSEMBLY FOR A GAS TURBINE ENGINE

TECHNICAL FIELD

The application relates generally to gas turbine engines and, more particularly, to tube assemblies for such engines.

BACKGROUND OF THE ART

Cases on gas turbine engines have tubes that interface with them. These tubes carry a variety of fluids into or out of the engine case. In some application, rigid tubes need to be installed in constricted spaces and/or with different engagement vectors at opposed ends of the tubes. Such arrangements may lead to excessive installation stresses. Additionally, there are times when rigid tube installation becomes physically challenging or even impossible due to engine physical constraints.

Tube assembly alternatives are, thus, desirable.

SUMMARY

In one aspect, there is provided a tube assembly for a gas turbine engine, comprising: a rigid tube having a first and a second end respectively connectable to a first port and a second port on the gas turbine engine, the first port and the second port respectively having first and second installation vectors, the first and second installation vectors being different; a tube adapter having a proximal end portion adjustably connected to the second port; and a coupling adjustably mounted to a distal end portion of the tube adapter, the coupling connectable to the second end of the rigid tube.

In another aspect, there is provided a gas turbine engine service tube assembly comprising: a service tube having a first end connected to a first port of a gas turbine engine; a tube adapter adjustably mounted to a second port of the gas turbine engine for alignment with a second end of the service tube, the first port and the second port having different orientations; and a coupling adjustably mounted to a distal end of the tube adapter, the coupling extendable relative to the distal end of the tube adapter for engagement with the second end of the service tube.

In a further aspect, there is provided a method for installing a rigid tube between first and second ports of a gas turbine engine, the first and second ports having different orientations, the method comprising: pre-installing a tube adapter on one of the first and second ports; adjusting a position of the tube adapter to align a distal end portion thereof with an adjacent end of the rigid tube, engaging a coupling at the distal end portion of the tube adapter with the adjacent end of the rigid tube; and securing the connection between the tube, the coupling and tube adapter.

In a still further aspect, adjusting the position of the tube adapter comprises moving the tube adapter along an axis of the one of the first and second ports. In accordance with another aspect, adjusting the position of the tube adapter further comprises rotating the tube adapter about the axis. In accordance with still another aspect, engaging the coupling with the rigid tube comprises slipping the coupling into position over the adjacent end of the rigid tube.

DESCRIPTION OF THE DRAWINGS

Reference is now made to the accompanying figures in which.

DETAILED DESCRIPTION

Figure 1:
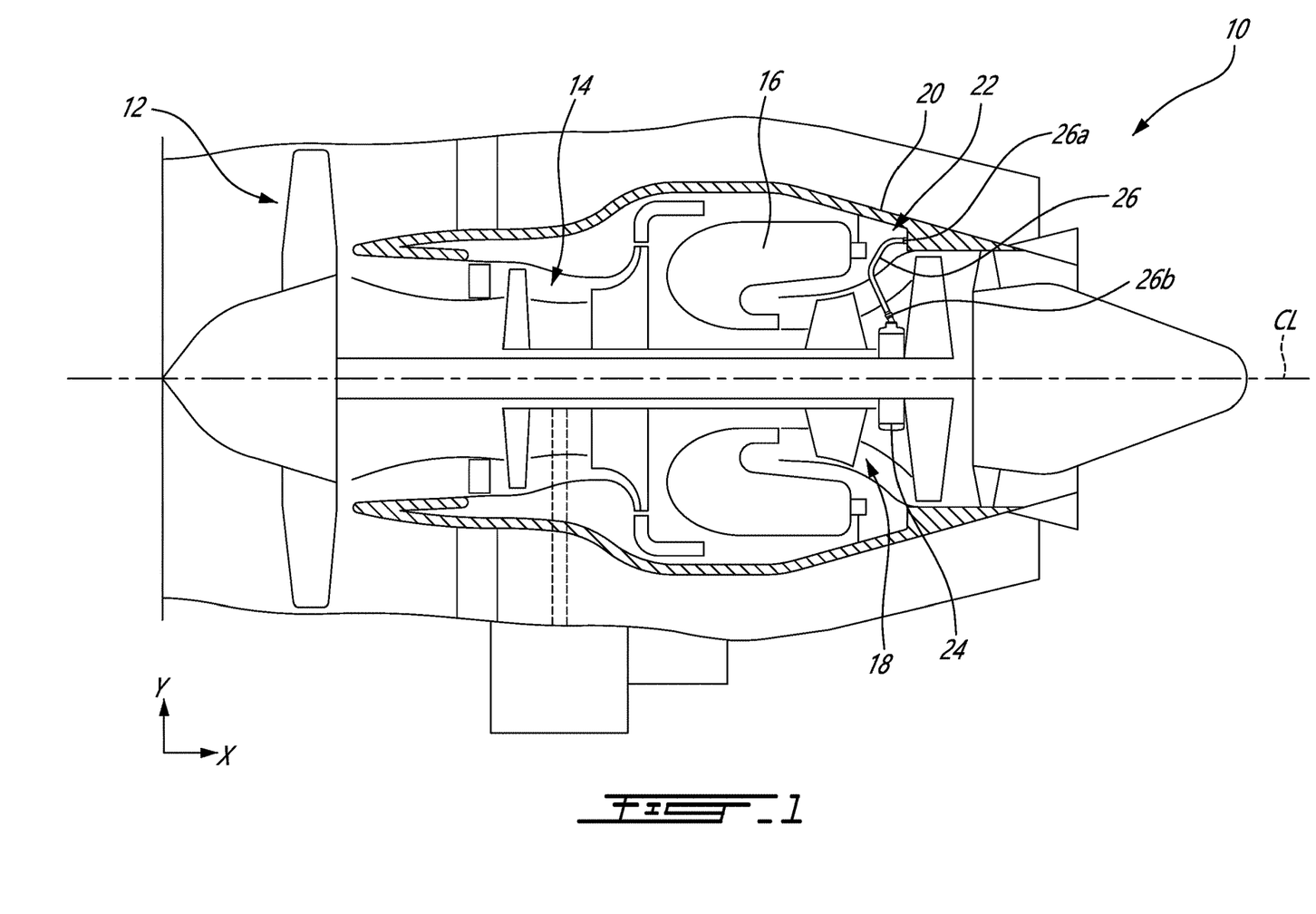
FIG. 1 is a schematic cross-sectional view of a gas turbine engine having a plurality of rigid tube assemblies between an engine case and a bearing housing.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
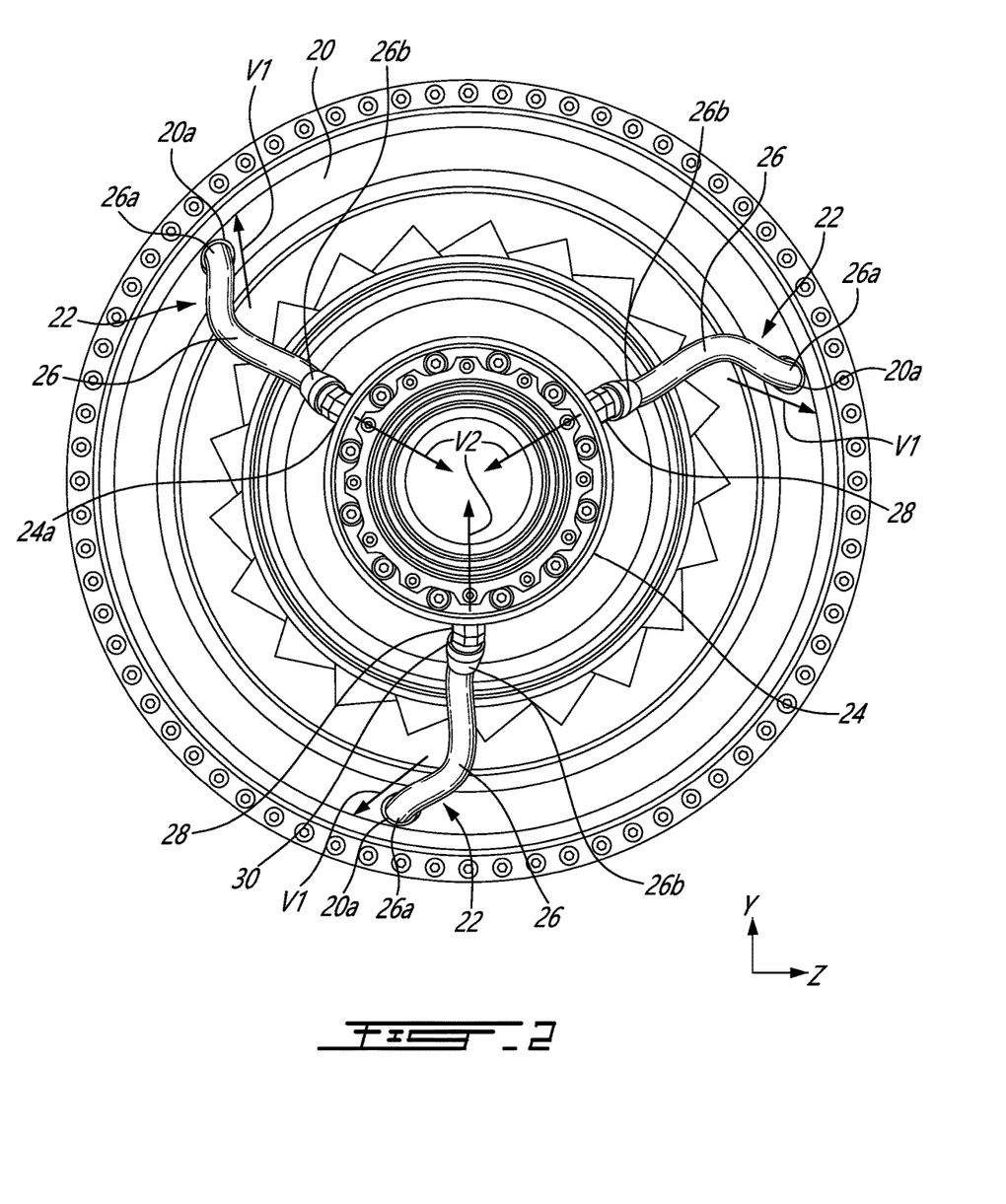
FIG. 2 is an end view illustrating circumferentially spaced-apart rigid tube assemblies between the engine case and the bearing housing.

As schematically exemplified in FIGS. 1 and 2, the engine 10 has a case 20 interfaced with a plurality of circumferentially spaced-apart tube assemblies 22 (three in the example illustrated in FIG. 2). The tube assemblies 22 may serve different purposes. For instance, the tube assemblies 22 may comprise tubes used for transporting a fluid, such as oil, fuel, coolant, air or liquid-gas mixtures (e.g. an oil-air mixture) between different portions of the gas turbine engine. Notably, these tubes include tubes known as service tubes, such as those used to supply oil to a bearing sump (an "oil supply tube"), to drain spent oil from the bearing sump (a "drain" or "scavenge tube"), to pressurize the bearing sump with air (a "pressure tube"), and to vent air from the bearing sump (a "ventilation tube"). According to the illustrated embodiment, the tube assemblies 22 are used to covey oil between the engine case 20 and an intermediate bearing housing 24. However, it is understood that the tube assemblies 22 could be used to fluidly interconnect other engine components and to convey fluid or gases other than oil and/or air-oil mixtures, the illustrated embodiment being representative of only one of the contemplated applications.

Each tube assembly 22 comprises a rigid tube 26 having a first end 26a adapted to be coupled to a corresponding port 20a on the engine case 20 and a second end 26b, which is, in turn, adapted to be coupled to a second port 24a (best shown in FIGS. 3-5) on the bearing housing 24. The ports 20a, 24a can have any suitable configurations and be provided with suitable coupling features for allowing the opposed ends of the tube 26 to be joined to the engine case 20 and the bearing housing 24. The term "rigid tube" is herein generally used in opposition to "flexible hose" and is intended to refer to metal tubing or other stiff or "inflexible" tubing structures having a predefined and permanent shape (i.e. tubes that are not intended to be forced out of shape). In accordance with some embodiments, the rigid tube may be formed using materials, such as aluminum, stainless steel, alloys and super alloy materials, such as nickel-based or cobalt superalloys. In general, the material is selected for enhanced strength, durability, and useful life, particularly at the high temperatures prevailing in a gas turbine engine environment.

As exemplified in FIG. 2, in some applications, the first and second ports 20a, 24a may have different orientations and, thus, provide for different installation vectors V1, V2 at the opposed ends of the tube. The term "installation vector" is herein intended to refer to the engagement direction of the rigid tube 26 with the first and second ports 20a, 24a. The engagement direction is generally dictated by the central axis of each of the ports 20a, 24a at opposed ends of the tube 22. Referring to FIGS. 1 and 2, it can be seen that the installation or engagement vectors V1, V2 may have different axial (X), radial (Y) and tangential (Z) components relative to the engine centerline CL. Such installation constraints, where rigid tubes have different installation vectors at opposed ends, may in some situations lead to excessive installation stresses.

According to some embodiments, a tube adapter 28 and a coupling 30 is pre-installed on at least one of the structures (e.g. the engine case 20 and/or the bearing housing 24) to which the tube 26 is to be coupled to allow for tube connection adjustment and, thus, at least reduce installation misalignment induced stresses. For instance, as shown in FIGS. 3 to 5, the second end 26b of tube 26 can be joined to the bearing housing 24 via tube adapter 28 and coupling 30.

Figure 3:
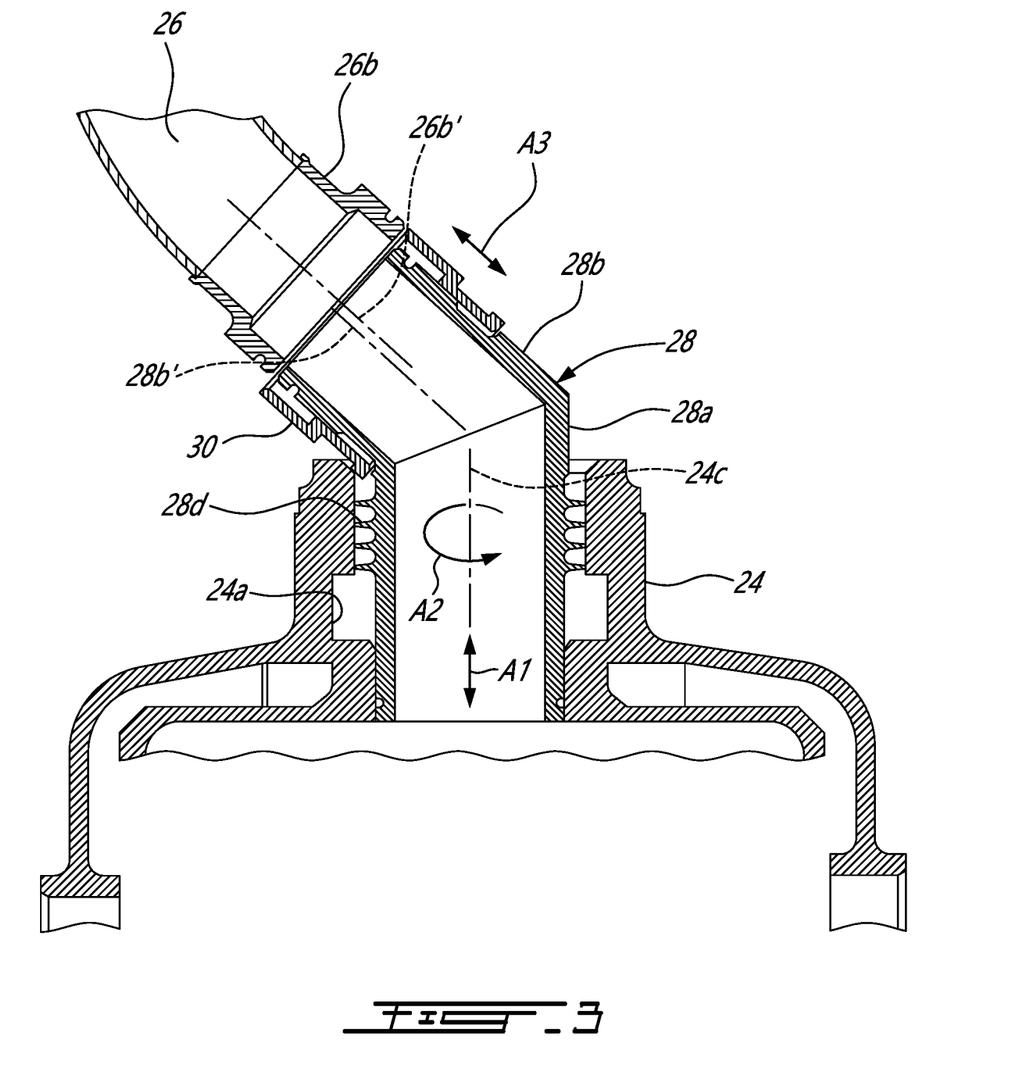
FIGS. 3 to 5 are enlarged cross-section views illustrating an installation procedure for joining the inner end of a tube of one of the rigid tube assemblies to the bearing housing.
Figure 4:
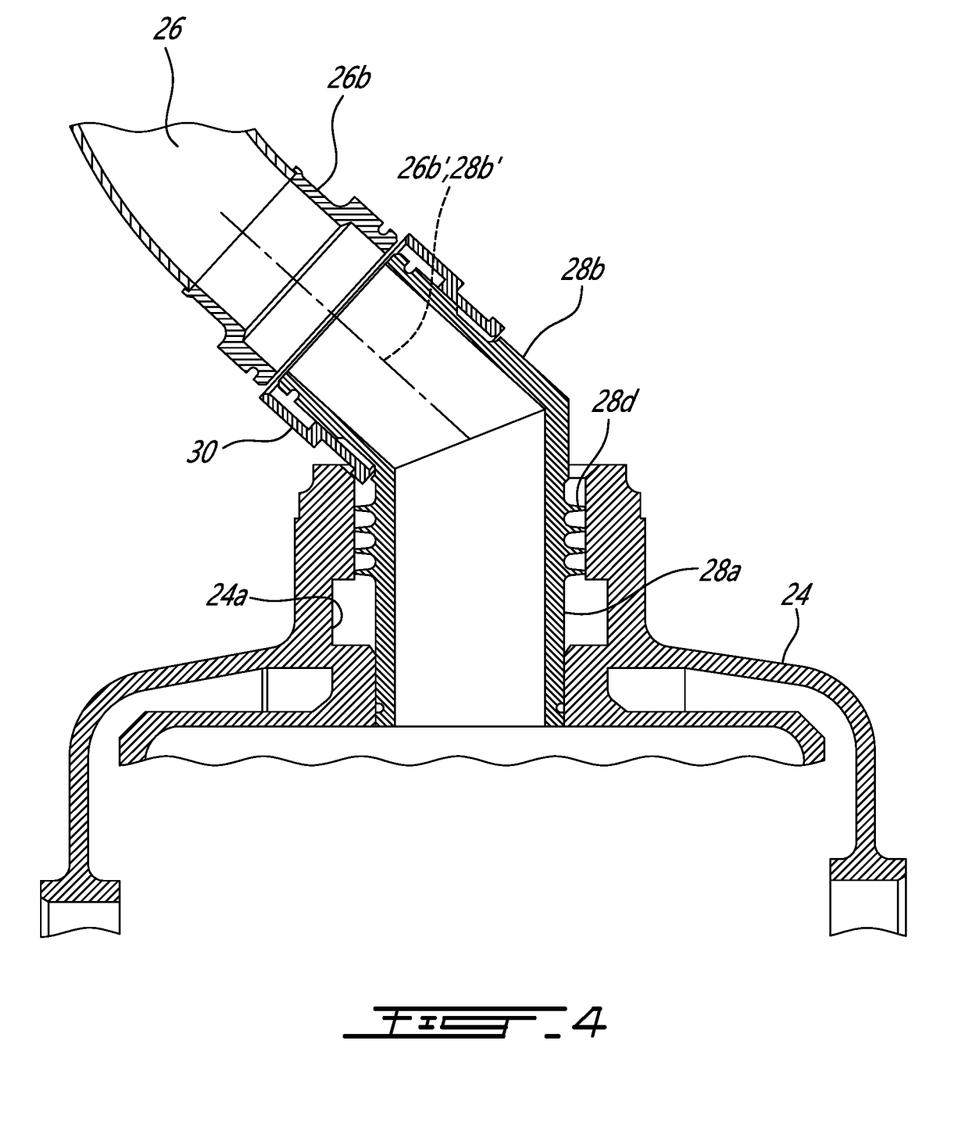
Figure 5:
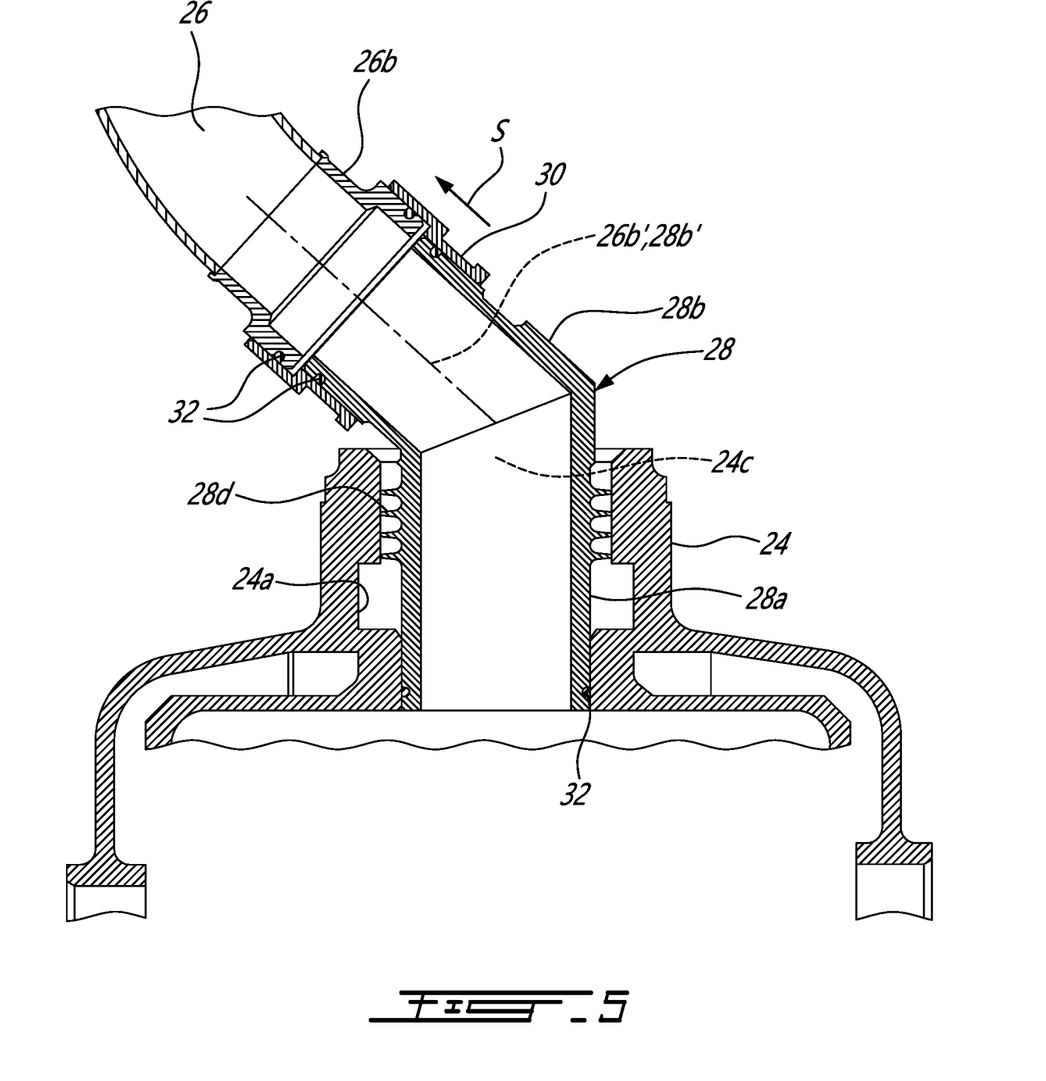

Referring to FIGS. 3-5, it can be seen that the tube adapter 28 has a tubular body including a proximal end portion 28a adjustably connectable to the bearing housing 24. According to the illustrated embodiment, the proximal end portion 28a is slidably engaged in the opening of port 24a. However, it is understood that the male/female mating engagement between the proximal end 28a of the tube adapter 28 and the bearing housing 24 could be reversed. A friction fit can be provided between the adapter 28 and the bearing housing 24 to allow the adapter 28 to temporarily retain its position relative to the bearing housing 24 while the installation procedure is being completed. A seal, such as a labyrinth seal 28d, can be provided between the tube adapter 28 and the bearing housing 24. According to some embodiments, the labyrinth seal 28d comprises an array of axially spaced-apart annular sealing fins integrally formed on an outer surface of the proximal end portion 28a of the tube adapter 28 for sealing engagement with an inner surface of the port 24a of the bearing housing 24. Such a sealing arrangement eliminates the need for O-rings, which were typically used at the interface of the tube and the mating structural component (e.g. the bearing housing) despite the fact such O-rings were prone to premature deterioration as their maximum operating temperature is at least in some instances less than the temperature of the interfacing structural component during some engine running conditions.

As illustrated in FIG. 3, the tube adapter 28 may have an elbow configuration including a distal end portion 28b projecting at an angle from the proximal end portion 28a outwardly from port 24a. The distal end portion 28b has a central axis 28b'. As depicted by arrows A1 and A2, the exemplified adapter 28 has two degrees of freedom relative to the bearing housing 24. The first degree of freedom A1 corresponds to a translation of the adapter 28 along the central axis 24c of the port 24a. The second degree of freedom A2 corresponds to a rotation of the adapter 28 about central axis 24c. As can be appreciated from FIGS. 3 and 4, the adapter 28 can, thus, be translated along axis 24c and rotated thereabout so as to bring the axis 28b' of the adapter 28 in alignment with the axis 26b' of the tube 26 (FIG. 4). This allows a "best fit" of all components while respecting the different installation vectors. It is understood that the tube adapter 28 could have more than two degrees of freedom to provide additional installation flexibility if need be.

Still referring to FIGS. 3-5, it can be appreciated that the coupling 30 is adjustably mounted to the distal end portion 28b of the tube adapter 28. The coupling 30 has at least one degree of freedom. According to some embodiments and as depicted by arrows A3 in FIG. 3, the coupling 30 is translatable along the central axis 28b' of the distal end portion 28b of the adapter 28. In the embodiment illustrated in FIGS. 3-5, the coupling 30 is provided in the form of a short sleeve slidably mounted over the distal end portion 28b of the adapter 28. However, it is understood that the male/female mating engagement between the coupling 30 and the adapter 28 could be reversed. Also, it is contemplated to threadably engage the coupling 30 to the distal end portion 28b of the adapter 28. As shown in FIG. 5, once the axis 28b' of the distal end 28b of the adapter 28 has been aligned with the axis 26b' of the second end 26b of the tube 26, the coupling 30 can be slipped over the aligned second end 26b of the tube 26 to provide a slip-joint fitting arrangement between the adapter 28 and the tube 26. Again, it is understood that the male/female mating engagement between the coupling 30 and the tube 26 could be reverse. Also, it is contemplated to provide a threaded connection between the coupling 30 and the tube 26.

Once the coupling 30 has been properly engaged with the second end 26b of the tube 26 as shown in FIG. 5, brazing joints 32 are made to secure the connection between the tube 26, the coupling 30, the adapter 28 and the bearing housing 24. Alternatively, the tube 26, the coupling 30, the adapter 28 and the bearing housing 24 could be welded, soldered or otherwise suitably fixedly secured to one another. It is also contemplated to use different combination of any suitable securing methods to fixedly join all the components.

According to some embodiments, the tube installation procedure generally comprises joining the first end 26a of the tube to the engine case 20 using appropriate fittings. The second end 26b of the tube 26 is joined to the bearing housing 24 by first installing the tube adapter 28 and the associated coupling 30 on the bearing housing 24. The coupling 30 can be pre-mounted over the distal end portion 28b of the tube adapter 28 or installed thereon after the tube adapter 28 has been engaged with the bearing housing 24. The initial misalignment between the tube axis 26b' and the axis 28b' of the distal end portion 28b of the pre-installed tube adapter 28 as shown in FIG. 2 is corrected by adjusting the position of the tube adapter 28 so as to bring the axes 26b', 28b' in alignment as shown in FIG. 4. The adjustment of the position of the tube adapter 28 includes at least one of translating the tube adapter 28 along the axis 24c of the bearing housing port 24a as depicted by arrows A1 and rotating the tube adapter 28 about axis 24c as represented by arrow A2. As can be appreciated from FIGS. 4 and 5, any remaining gaps between the tube 26 and the tube adapter 28, which may be due to stack-up build up, is accommodated by the coupling 30. More particularly, the coupling 30 can be extended from the distal end portion 28b of the tube adapter 28 so as to engage the second end 26b of the tube 26. According to the illustrated example, the coupling 30 is slipped over the second end 26b of the tube 26 by sliding the coupling 30 on the tube adapter 28 in the direction depicted by arrow S in FIG. 5. Once the tube adapter 28 and the tube 26 have been joined together via the coupling 30, the joint components are secured all together. According to some embodiments, brazed joints 32 are created to fixedly secure the tube 26, the coupling 30, the tube adapter 28 and the bearing housing 24 to one another. It is noted that the above installation procedure at the second end 26b of the tube 26 could be replicated at the first end 26a of the tube 26 to connect the tube 26 to the engine case 20. Alternatively, the tube adapter and the coupling could be pre-installed on the engine case 20 and a conventional tube fitting could be provided at the second end 26b of the tube 26 for connection with the bearing housing 24. Various permutations are contemplated (e.g. separate tube adapter 28 and coupling 30 at both ends of the tube 26, only at the first end or only at the second end).

Figure 6:
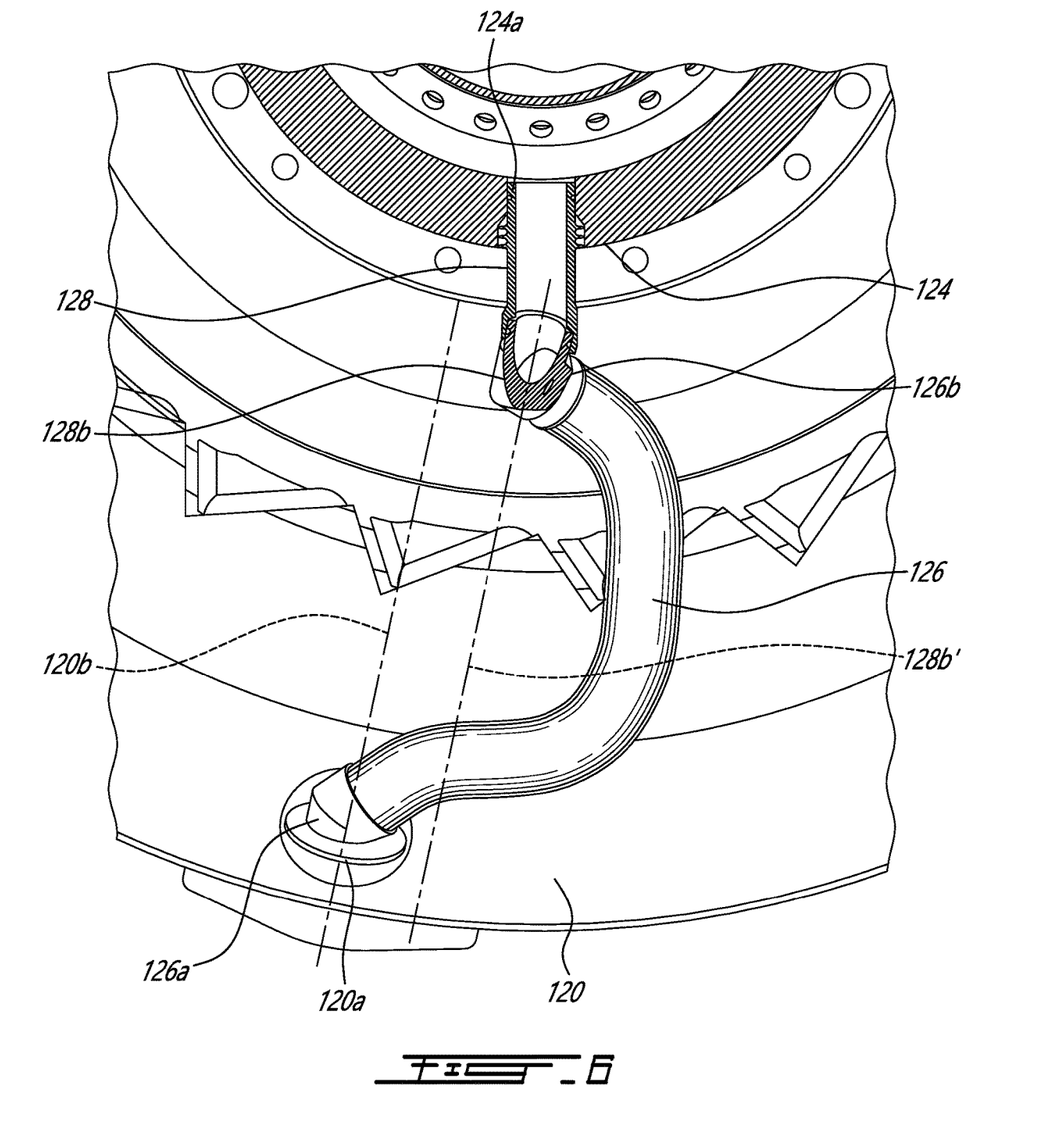
FIG. 6 is a cross-section view of another example of a tube assembly having different but parallel tube engagement vectors at opposed ends of the tube.

FIG. 6 illustrates another tube installation wherein the adapter-to-tube joint is parallel to the tube-to-case joint. More particularly, the first end 126a of rigid tube 126 is coupled to a first port 120a on the engine case 120. The first port has a central axis 120b defining a first installation vector for the engagement of the first end 126a of the tube 126 with the engine case 120 (tube-to-case joint). As shown in FIG. 6, the first end 126a of the tube 126 is provided with a suitable fitting or end connection for connection with the first port 120a on the engine case 120. Likewise, the second end 126b of the tube 126 is provided with a suitable fitting or end connection for connection with a separate tube adapter 128 pre-installed in a mating port 124a on the bearing housing 124. The tube adapter 128 is translatable in and out from the port 124a and rotatable about the axis of the port 124a to facilitate the connection of the tube 126 to the bearing housing 124. The tube adapter 128 has a tubular distal end 128b having a central axis 128b'. The axis 128b' of the tube adapter 128 defines a second engagement vector for the engagement of the adapter 128 with the second end 126b of the tube 126 (adapter-to-tube joint). As can be appreciated from FIG. 6, the axis 128b' of the tube adapter 128 and the axis 120b of the first port 120a are parallel to one another. This allows the tube 126 to be installed into both joints simultaneously as there is no tangential shift of axis 128b' resulting from the translation of the tube adapter 128 relative to the bearing housing 124 (the movement of the tube adapter 128 in the bearing housing port 124a is not accompanied by a tangential movement). In some applications, where the tube installation is not affected due to stack-up build up, the parallel arrangement of the joint axes might even eliminate the need for a coupling, such as coupling 30 shown in FIGS. 3 to 5.

In accordance with at least some embodiments, the introduction of a separate tube adapter and coupling, where the adapter and coupling are pre-installed to an engine structure to which the tube is to be coupled allows the tube to be installed along different fitting's installation vectors at opposed ends of the tube. In accordance with some embodiments, the tube adapter and the coupling facilitate the installation and the alignment of the parts, thereby mitigating installation induces stresses.

In accordance with some embodiments, the adapter and coupling are first pre-installed into one end (example: bearing housing), which then facilitates the installation of the tube along the other fitting's installation vector. Before securing the tube in place, all components (tube, separate fitting, and coupling) have some degrees of freedom. This allows a "best fit" of all components while respecting the different engagement vectors as well as the related stack-up build up. Before the final securing operation (e.g. brazing operation), the coupling slides onto the tube forming a rigid tube connection.

In view of the foregoing, it can be appreciated that at least some of the embodiments allow for a rigid tube installation that has two fittings with different engagement vectors with reduced installation stresses. The degree of freedoms provided by the tube adapter and the coupling allow the assembly of parts in constricted engine spaces.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the tube adapter does not have to be straight. It can have a bend or two bends with cross drilling. Also, the tube could have more than two ends (e.g. a Y-shape tube). Furthermore, it is noted that the tube adapter and the coupling can be made from a different material that has better properties for that specific location, or a less expensive material than the material used for the tube. While the tube adapter and the coupling have been exemplified in connection with the tube-to-bearing housing joint, it is understood that a separate tube adapter and associated coupling could be pre-installed on the engine case as well to provide a similar adjustable joint at both ends of the tube. Yet further modifications could be implemented by a person of ordinary skill in the art in view of the present disclosure, which modifications would be within the scope of the present technology.

The invention claimed is:

1. A tube assembly for a gas turbine engine, comprising:
a rigid tube having a first and a second end respectively connectable to a first port and a second port on the gas turbine engine, the first port and the second port respectively having first and second installation vectors, the first and second installation vectors being different;
a tube adapter having a proximal end portion adjustably connectable to the second port; and
a coupling adjustably mountable to a distal end portion of the tube adapter, the coupling connectable to the second end of the rigid tube;
wherein the second port has a central axis, the tube adapter rotatable about the central axis of the second port, and wherein the proximal end portion of the tube adapter is adjustably axially insertable into the second port of the gas turbine engine, and wherein the distal end portion of the tube adapter extends at an angle from the proximal end portion so as to define and elbow.

2. The tube assembly as defined in claim 1, wherein the tube adapter has at least two degrees of freedom.

3. The tube assembly as defined in claim 2, wherein the at least two degrees of freedom includes a rotation and a translation of the tube adapter relative to the second port of the gas turbine engine.

4. The tube assembly as defined in claim 1, wherein the coupling has at least one degree of freedom relative to the tube adapter.

5. The tube assembly as defined in claim 4, wherein the at least one degree of freedom of the coupling is a translation of the coupling along the distal end portion of the tube adapter.

6. The tube assembly as defined in claim 1, wherein the coupling is a slip-joint fitting.

7. The tube assembly as defined in claim 1, wherein braze or weld joints are provided to fixedly secure the tube, the coupling and the tube adapter once the tube, the coupling and the tube adapter have been adjustably joined all together.

8. The tube assembly as defined in claim 1, wherein axially spaced-apart sealing fins are integrally formed on an outer surface of the proximal end portion of the tube adapter.

9. A gas turbine engine service tube assembly comprising:
a service tube having a first end connected to a first port of a gas turbine engine;
a tube adapter adjustably mounted to a second port of the gas turbine engine for alignment with a second end of the service tube, the first port and the second port having different orientations; and
a coupling adjustably mounted to a distal end of the tube adapter, the coupling extendable relative to the distal end of the tube adapter for engagement with the second end of the service tube;
wherein the tube adapter is an elbow having a proximal end portion slidably engaged in an opening defined by the second port, and the distal end portion extending at an angle from the proximal end portion outwardly from the second port, the proximal end portion being rotatably received in the opening.

10. The gas turbine engine service tube assembly as defined in claim 9, wherein the proximal end portion of the tube adapter is sealingly engaged with an inner wall of the second port.

11. The gas turbine engine service tube assembly as defined in claim 10, wherein sealing fins are integrally formed on and spaced-apart along an outer surface of the proximal end portion of the tube adapter.

12. The gas turbine engine service tube assembly as defined in claim 9, wherein the tube adapter has at least two degrees of freedom including a rotation and a translation of the tube adapter relative to the second port of the gas turbine engine.

13. The gas turbine engine service tube assembly as defined in claim 9, wherein the coupling is adjustably translatable along the distal end portion of the tube adapter.

14. The gas turbine engine service tube assembly as defined in claim 9, wherein the coupling is a slip-joint fitting.

15. The gas turbine engine service tube assembly as defined in claim 9, wherein the first port and the second port are respectively provided on an engine case and a bearing housing.

\* \* \* \* \*